(12) United States Patent
Ko

(10) Patent No.: US 8,508,731 B2
(45) Date of Patent: Aug. 13, 2013

(54) SPECTROMETER CAPABLE OF ELIMINATING SIDE-TAIL EFFECTS

(75) Inventor: Cheng-Hao Ko, Hsinchu County (TW)

(73) Assignee: OTO Photonics, Inc., Hsinchu (TW)

( * ) Notice: Subject to any disclaimer, the term of this patent is extended or adjusted under 35 U.S.C. 154(b) by 228 days.

(21) Appl. No.: 12/987,624

(22) Filed: Jan. 10, 2011

(65) Prior Publication Data

US 2011/0170099 A1    Jul. 14, 2011

Related U.S. Application Data

(60) Provisional application No. 61/293,921, filed on Jan. 11, 2010.

(51) Int. Cl.
*G01J 3/28*    (2006.01)
(52) U.S. Cl.
USPC .......................................... 356/328; 356/326
(58) Field of Classification Search
USPC ................................................ 356/326, 328
See application file for complete search history.

(56) References Cited

U.S. PATENT DOCUMENTS

| | | | | |
|---|---|---|---|---|
| 5,289,002 | A | * | 2/1994 | Tarn ................................ 250/239 |
| 6,037,655 | A | * | 3/2000 | Philbrick et al. ............... 257/680 |
| 7,092,090 | B2 | * | 8/2006 | Shimizu et al. ................ 356/328 |
| 2009/0148969 | A1 | * | 6/2009 | Derderian et al. ............... 438/28 |

* cited by examiner

*Primary Examiner* — Gregory J Toatley
*Assistant Examiner* — Dominic J Bologna
(74) *Attorney, Agent, or Firm* — Muncy, Geissler, Olds & Lowe, PLLC

(57) ABSTRACT

A spectrometer capable of eliminating side-tail effects includes a body and an input section, a diffraction grating, an image sensor unit and a wave-guiding device, which are mounted in the body. The input section receives a first optical signal and outputs a second optical signal travelling along a first light path. The diffraction grating receives the second optical signal and separates the second optical signal into a plurality of spectrum components, including a specific spectrum component travelling along a second light path. The image sensor unit receives the specific spectrum component. The wave-guiding device includes first and second reflective surfaces opposite to each other and limits the first light path and the second light path between them to guide the second optical signal and the specific spectrum component. The first and second reflective surfaces are separated from a light receiving surface of the image sensor unit by a predetermined gap.

20 Claims, 15 Drawing Sheets

SPECTROMETER CAPABLE OF ELIMINATING SIDE-TAIL EFFECTS

This application claims priority of U.S. Provisional Patent Application Ser. No. 61/293,921, filed on Jan. 11, 2010, the entire content of which is hereby incorporated by reference.

BACKGROUND OF THE INVENTION

1. Field of the Invention

The invention relates in general to a spectrometer capable of eliminating side-tail effects, and more particularly to a spectrometer capable of eliminating side-tail effects using a slab wave-guiding device.

2. Related Art

A spectrometer is the nondestructive detection instrument for analyzing the compositions and properties of the substances, for example. After the light beams impinge upon the substances, different bands of light beams may be differently absorbed by the substances and differently transmit through the substances, and are finally reflected by the substances, so that the reflected light beams are received by the spectrometer in the form of corresponding spectrums. Because different substances appear the individual characteristic spectrums, the compositions and properties of the substances may be analyzed.

In order to reduce the light loss, the spectrometer usually includes a wave-guiding device for guiding the light beams travelling in the internal channel, so that the image sensor of the spectrometer can sense the spectrums generated by the diffraction grating. The conventional arrangement is to dispose the image sensor in close contact with the wave-guiding device in order to reduce the light loss. However, the applicant has found that the image sensor disposed in close contact with the wave-guiding device obtains the incorrect spectral reading of the spectrum resolution due to the side-tail effects.

SUMMARY OF THE INVENTION

It is therefore an object of the invention to provide a spectrometer capable of eliminating side-tail effects by separating a wave-guiding device from an image sensor unit by a predetermined distance.

To achieve the above-identified object, the invention provides a spectrometer capable of eliminating side-tail effects. The spectrometer includes a body, an input section, a diffraction grating, an image sensor unit and a wave-guiding device. The input section, mounted in the body, receives a first optical signal and outputs a second optical signal travelling along a first light path. The diffraction grating, mounted in the body, receives the second optical signal and separates the second optical signal into a plurality of spectrum components, comprising a specific spectrum component travelling along a second light path. The image sensor unit, mounted in the body, receives the specific spectrum component. The wave-guiding device is mounted in the body and comprises a first reflective surface and a second reflective surface opposite to each other, for limiting the first light path and the second light path between the first reflective surface and the second reflective surface to guide the second optical signal and the specific spectrum component. The first and second reflective surfaces are separated from a light receiving surface of the image sensor unit by a predetermined gap.

Thus, the designer can easily obtain or choose the predetermined gap according to the parameter of the image sensor unit to effectively eliminate the negative influences caused by the side-tail effects.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

The present invention will be apparent from the following detailed description, which proceeds with reference to the accompanying drawings, wherein the same references relate to the same elements.

Figure 1:
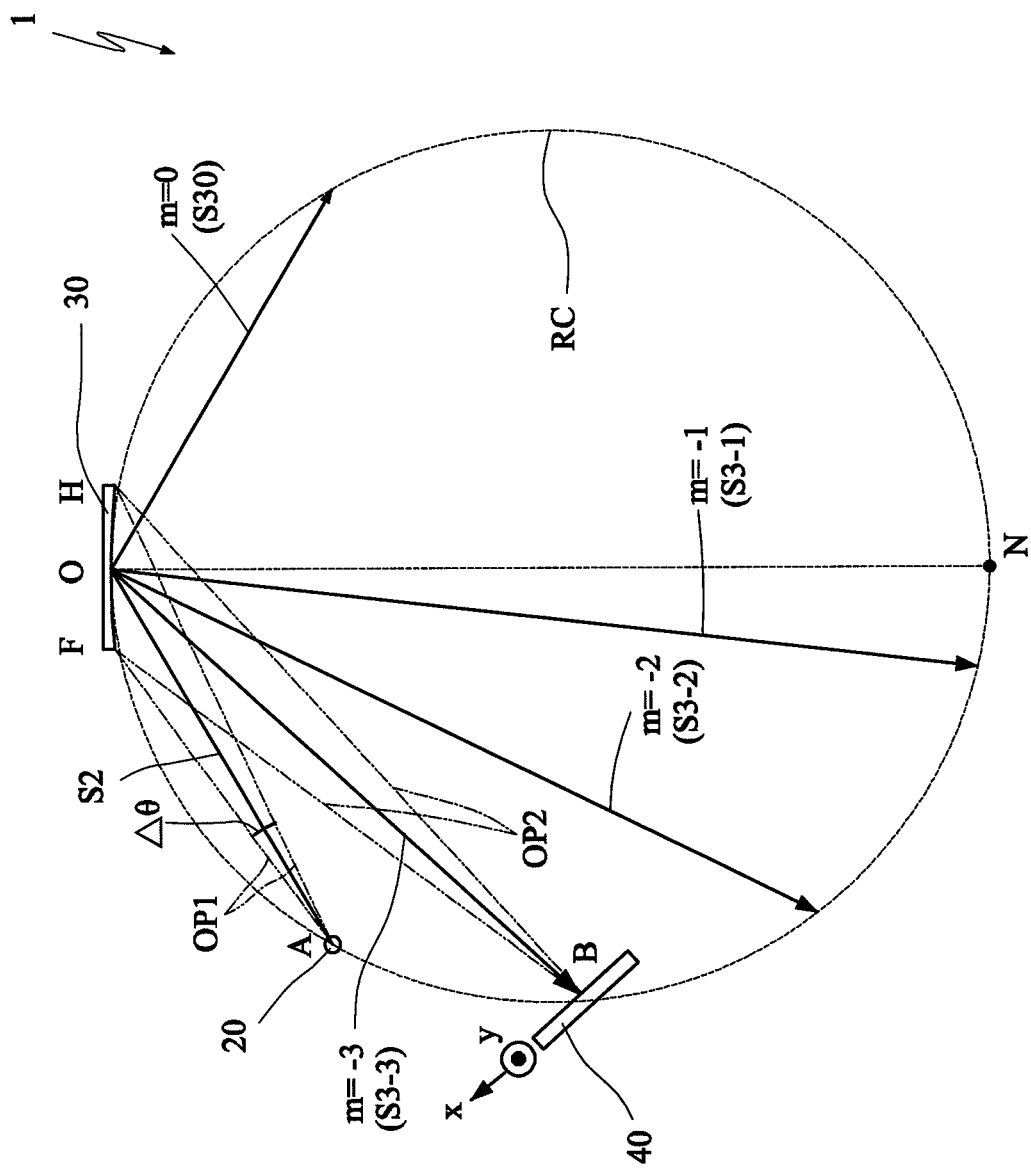
FIG. 1 is a schematic illustration showing a spectrometer configured according to a Rowland circle according to a preferred embodiment of the invention.
Figure 2A:
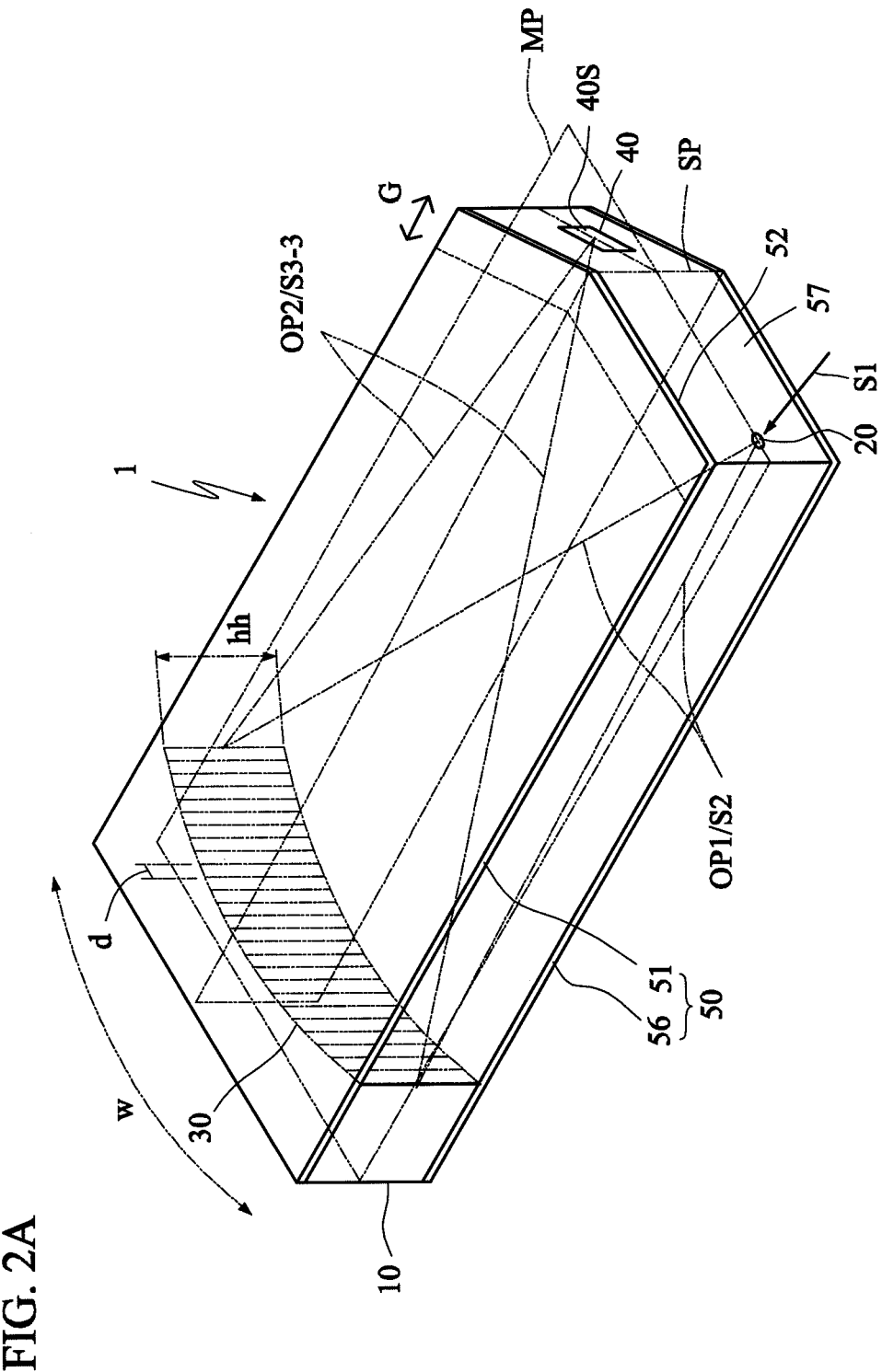
FIG. 2A is a pictorial view showing the spectrometer according to a preferred embodiment of the invention.

FIG. 1 is a schematic illustration showing a spectrometer 1 configured according to a Rowland circle according to a preferred embodiment of the invention. FIG. 2A is a pictorial view showing the spectrometer 1 according to a preferred embodiment of the invention. As shown in FIGS. 1 and 2A, the spectrometer 1 may be an ordinary spectrometer, a microspectrometer or a mini-spectrometer, and includes a body 10, an input section 20, a diffraction grating 30, an image sensor unit 40 and a wave-guiding device 50, wherein the four elements 20, 30, 40 and 50 are disposed in the body 10, and the elements 20, 30 and 40 are disposed on the Rowland circle RC. In an electronic apparatus, disposing various elements in or on the body 10 may be easily done. Although the body is not clearly shown in FIGS. 1 and 2A, the body 10 of FIGS. 2B to 2D may be easily defined by those skilled in the art according to FIGS. 1 and 2A.

The diffraction grating 30 has two end portions F and H, and the wavelength dispersion plane of the diffraction grating 30 is defined as a meridional plane MP. The input section 20 located at the point A and the image sensor unit 40 located at the point B are both disposed on the same plane MP. The concave profile of the diffraction grating 30 is a portion of a cylinder. Blazes of the diffraction grating are distributed on a surface of the portion of the cylinder. The radius of the cylinder is called as a meridional radius of the grating. The line segment $\overline{NO}$ is defined as the normal line of the grating and serves as the diameter of the Rowland circle RC. The radius of the concave profile of the diffraction grating 30 is equal to $\overline{NO}$, wherein points O and N are also located on the Rowland circle RC, and $\Delta\theta$ is a horizontal divergent angle of the incident light beam.

The input section 20, typically including a slit and being mounted in the body 10, receives a first optical signal S1 and outputs a second optical signal S2 travelling along a first light path OP1. For example, the first optical signal S1 may come from an optical fiber or the external environment, or may be reflected by a to-be-tested object or transmitting through the to-be-tested object.

The diffraction grating 30, having the height hh and being mounted in the body 10, receives the second optical signal S2 and separates the second optical signal S2 into a plurality of spectrum components S3, which includes a specific spectrum component (e.g., the following S3-3), travelling along a second light path OP2. It is to be noted that the spectrum components S3 may include a zeroth-order spectrum S30 (m=0), a first-order spectrum (not shown), a second-order spectrum (not shown), a third-order spectrum (not shown), a minus first-order spectrum S3-1 (m=-1), a minus second-order spectrum S3-2 (m=-2), a minus third-order spectrum S3-3 (m=-3) and the like. In this invention, the minus third-order spectrum S3-3 serving as the specific spectrum component will be described as an example. It is to be noted that the invention may also be applied to the elimination of the side-tail effects of the other orders of spectrums.

The image sensor unit 40, mounted in the body 10, receives the specific spectrum component S3-3. The wave-guiding device 50 is mounted in the body 10 and includes a first reflective surface 52 and a second reflective surface 57 opposite to each other, and limits the first light path OP1 and the second light path OP2 between the first reflective surface 52 and the second reflective surface 57 to guide the second optical signal S2 and the specific spectrum component S3-3. A predetermined gap G is formed between a light receiving surface 40S of the image sensor unit 40 and a distal end (defined according to the travelling direction of the light) of the first and second reflective surfaces 52 and 57. Specifically speaking, the wave-guiding device 50 includes a first reflecting mirror 51 having the first reflective surface 52, and a second reflecting mirror 56 having the second reflective surface 57.

Figure 2B:
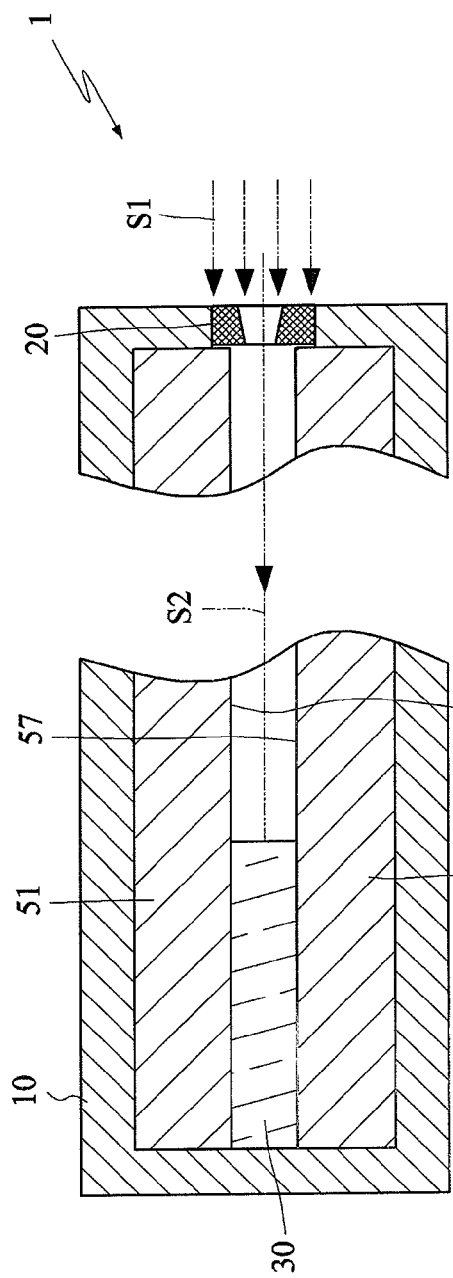
FIGS. 2B and 2C are cross-sectional views respectively showing light inputting and outputting states of the spectrometer according to the preferred embodiment of the invention.
Figure 2C:
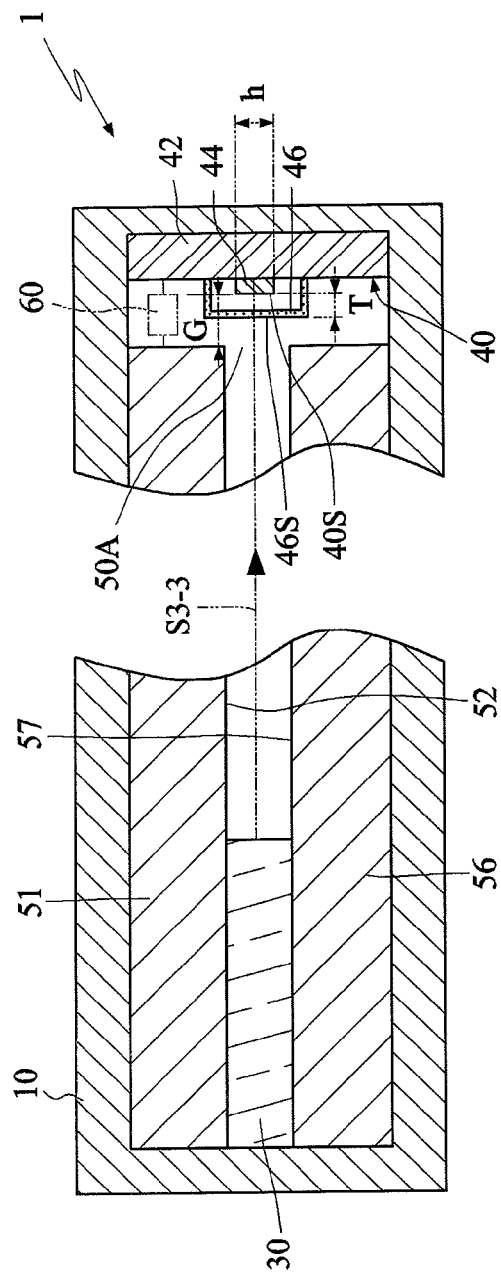
Figure 2D:
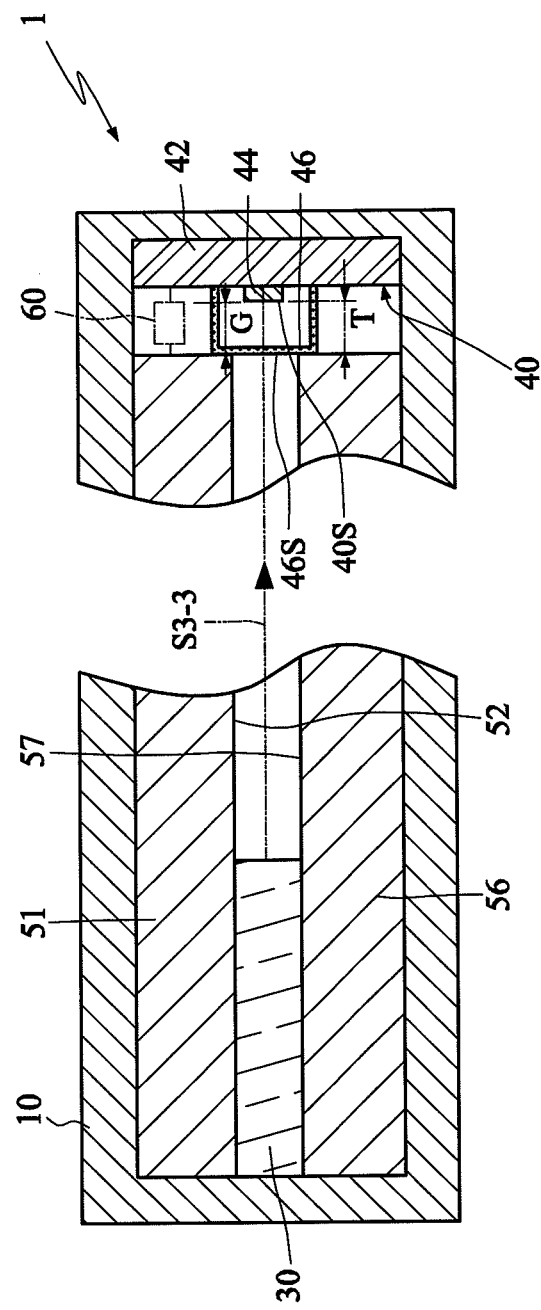
FIG. 2D shows the wave-guiding device according to another example of the invention.

FIGS. 2B to 2D are cross-sectional views respectively showing light inputting and outputting states of the spectrometer according to the preferred embodiment of the invention. It is to be noted that FIGS. 2A to 2D are not depicted according to a real scale but are depicted only for the purpose of clear illustration. Please refer to FIG. 2C or 2D, the definition of the width of the predetermined gap G in this invention is the distance from the light receiving surface 40S of the image sensor unit 40 to the distal ends of the first and second reflective surfaces 52 and 57. In FIG. 2C, an opening 50A of the wave-guiding device 50 is separated from the light receiving surface 40S of the image sensor unit 40 by the predetermined gap G, and the spectrum components S3 leave the opening 50A and enter the image sensor unit 40. The opening 50A, located between the first reflecting mirror 51 and the second reflecting mirror 56, is substantially perpendicular to the first reflective surface 52 or the second reflective surface 57.

Referring to FIGS. 2C and 2D, the image sensor unit 40 includes a substrate 42, at least one pixel of photo sensor 44 and a protection cover 46. When multiple pixels of photo sensors 44 are provided, the pixels of photo sensors 44 are arranged in a direction perpendicular to the paper surface of FIG. 2C or 2D. The at least one pixel of photo sensor 44, having the light receiving surface 40S and being disposed on the substrate 42, receives the specific spectrum component S3-3. Consequently, the signal obtained by the at least one pixel of photo sensor 44 can be transmitted to and processed by a computer or a processor of the spectrometer. The protection cover 46 may be a cover glass layer, which is disposed above the substrate 42 and covers the at least one pixel of photo sensor 44. In FIG. 2D, the first and second reflective surfaces 52 and 57 are tightly rest against an external surface 46S of the protection cover 46. The predetermined gap G may be satisfied by giving the protection cover 46 a thickness substantially equal to the width of the predetermined gap G. In this invention, the thickness T of the protection cover 46 is defined as the distance from the light receiving surface 40S of the image sensor unit 40 to the external surface 46S of the protection cover 46, as shown in FIG. 2C or 2D. However, the thickness T of the protection cover 46 of most available image sensor units in the market, generally speaking, cannot satisfy the requirement of the width of the predetermined gap G in a design according to this invention. So, the first and second reflective surfaces 52 and 57 are not allowed to tightly rest against the protection cover 46, as shown in FIG. 2C, unless the protection cover 46 with the thickness T substantially equal to the predetermined gap G is specially manufactured to achieve the implementation of FIG. 2D. Nevertheless, for the optical effect for the purpose of this invention, there is no substantial difference between the implementations of FIGS. 2D and 2C. In one example, the width of the predetermined gap G is 1.75 mm, and the thickness T of the protection cover 46 is 0.7 mm. Therefore, the thickness T of the protection cover 46 is smaller than the width of the predetermined gap G, so that the first and second reflective surfaces 52 and 57 have to be separated from the external surface 46S of the protection cover 46 in order to eliminate the side-tail effects. In another design choice, the width of the predetermined gap G is 2.00 mm, and the thickness T of the protection cover 46 is 2.00 mm. Therefore, the thickness T of the protection cover 46 is equal to the width of the predetermined gap G, so that the first and second reflective surfaces 52 and 57 must tightly rest against the external surface 46S of the protection cover 46 in order to eliminate the side-tail effects.

In addition, the spectrometer 1 may further include an adjusting mechanism 60, connected to the image sensor unit 40 and the wave-guiding device 50, for adjusting the predetermined gap G. Thus, the adjusting mechanism 60 may also be referred to as a spacer, which connects the image sensor unit 40 to the wave-guiding device 50, and fixes the predetermined gap G. The spacer is disposed outside the second light path OP2 (see FIGS. 2A and 2C), along which the spectrum components S3 travel from the diffraction grating to the image sensor unit. The adjusting mechanism 60 may include mechanisms, such as a screw and a cam. In this invention, the predetermined gap G relates to a height h of the pixel of photo sensor 44 in a direction perpendicular to the first and second reflective surfaces 52 and 57.

Figure 2E:
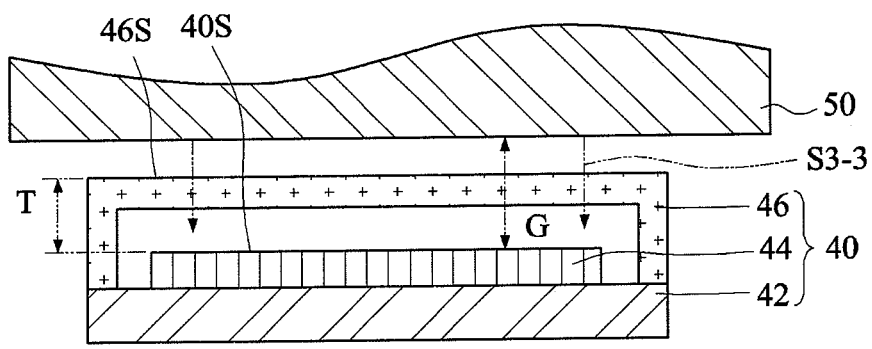
FIG. 2E is a partial top view showing the spectrometer of FIG. 2C.
Figure 2F:
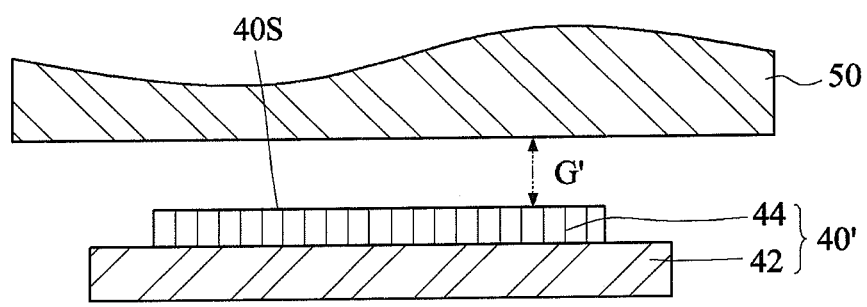
FIGS. 2F to 2H are partial top views showing several examples of the spectrometer of the invention.

FIG. 2E is a partial top view showing the spectrometer of FIG. 2C. Referring to FIG. 2E, the image sensor unit 40 includes the substrate 42, the at least one pixel of photo sensor 44 and the protection cover 46. The at least one pixel of photo sensor 44 senses the specific spectrum component S3-3, has the light receiving surface 40S and is disposed on the substrate 42. The protection cover 46 is disposed above the substrate 42 and covers the at least one pixel of photo sensor 44. It is to be noted that the protection cover 46 may be removed as shown in FIG. 2F, for example when waterproof consideration is included in the design of the body 10 of the spectrometer. The image sensor unit 40' of the spectrometer of FIG. 2F only has the substrate 42 and the at least one pixel of photo sensor 44. Comparing FIG. 2E with FIG. 2F, because of the refraction index of the protection cover 46, the width of the predetermined gap G of FIG. 2E is larger than the width of the predetermined gap G' of FIG. 2F.

Figure 2G:
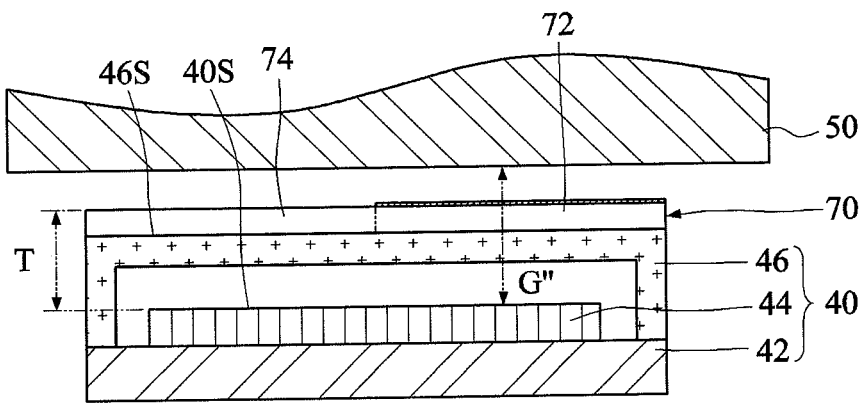

Referring to FIG. 2G, the spectrometer further includes a filter 70 disposed on the external surface 46S of the protection cover 46 and between the protection cover 46 and the wave-guiding device 50. The filter 70 has a substrate generally made of fused silica or glass, and the substrate is partially coated so that the filter 70 has an uncoated section 74 and a coated section 72. The coated section 72 is used for filtering out a portion of the spectrum components having a predetermined range of wavelength. In an example, the coated section 72 is designed to block the spectrum components having a range of wavelength from 200 nm to 400 nm. In the implementation of FIG. 2G, because of the refraction index of the substrate filter 70, the width of the predetermined gap G" of FIG. 2G is larger than the width of the predetermined gap G of FIG. 2E.

Figure 2H:
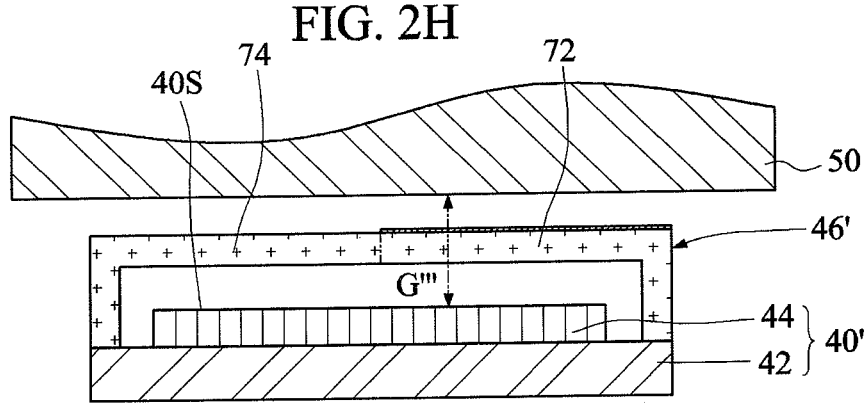

As shown in FIG. 2H, the protection cover 46' may be partially coated to have the uncoated section 74 and coated section 72. The coated section 72 is used for filtering out a portion of the spectrum components having a predetermined range of wavelength, so that the protection cover 46' can function as the filter. In the implementation of FIG. 2H, because the thickness of the coating material for the coated section 72 is much smaller than the thickness of the protection cover 46', the width of the predetermined gap G'" of FIG. 2H is substantially equal to the width of the predetermined gap G' of FIG. 2E.

The predetermined gap G is obtained by a series of theoretical derivations and software simulations, the details of which will be described in the following.

The simulation parameters of the invention will be described in the following. The $\overline{NO}$ of FIG. 1 is 44.404 mm, the width of the slit of the input section 20 at the entrance point A is 25 μm; the incident arm length is 22.202 mm; the incident angle α(∠AON) is −60°; the pitch (grating period) d of the periodic pattern of the diffraction grating 30 is 3 μm; the grating arc length w is 7.75 mm (see FIG. 2A); the grating height hh is 0.125 mm; the incident beam has the wavelength λ of 1558.4 nm; and the diffraction angle β relates to the wavelength by the following equation (grating equation):

$$\sin\alpha + \sin\beta = \frac{m\lambda}{d}, \quad (1)$$

wherein m is the diffraction order. For the simulation, the diffraction order m=−3 is used, which yields β=−43.8° (∠BON) at the wavelength λ=1558.4 nm according to Equation (1).

The ray tracing of the slab-waveguide micro-grating (SWMG) system is simulated by using the ray tracing software TracePro, which is capable of handling the grating diffracted beam with the diffraction efficiency provided by the user. Rigorous diffraction efficiency calculation of the blazed micro-grating is performed by using the software PCGrate.

The image sensor unit 40 is placed so that its center is located at the diffracted light focus point on the Rowland circle RC and its surface is perpendicular to the main beam from the point O, as shown in FIG. 1. That is, the image sensor unit 40 is located on the Gaussian image plane. In this embodiment, a sensor area of 1.50 mm (horizontal dimension) by 0.90 mm (vertical dimension) is used in the simulated ray tracing. In particular, the predetermined gap G (as depicted in FIG. 2A) is varied, as well as the vertical (in the sagittal plane) divergent half-angles δ/2 (in degrees) of the incident beam. In all simulations, the horizontal (in the meridional plane) divergent half-angle of the incident beam remains at 12°.

Figure 3A:
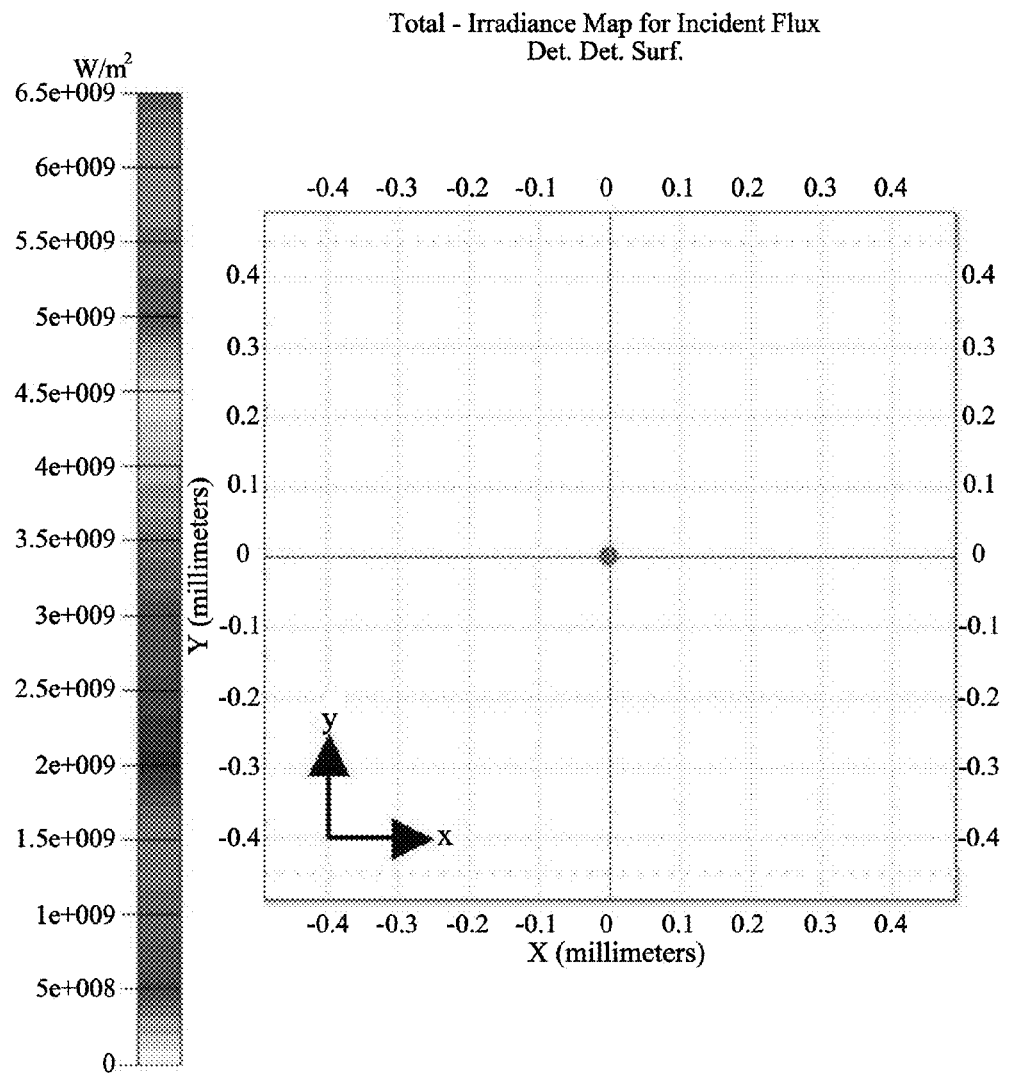
FIGS. 3A and 3B show simulated diffraction intensity distributions on the sensor at a focal plane (Gauss image plane).
Figure 3B:
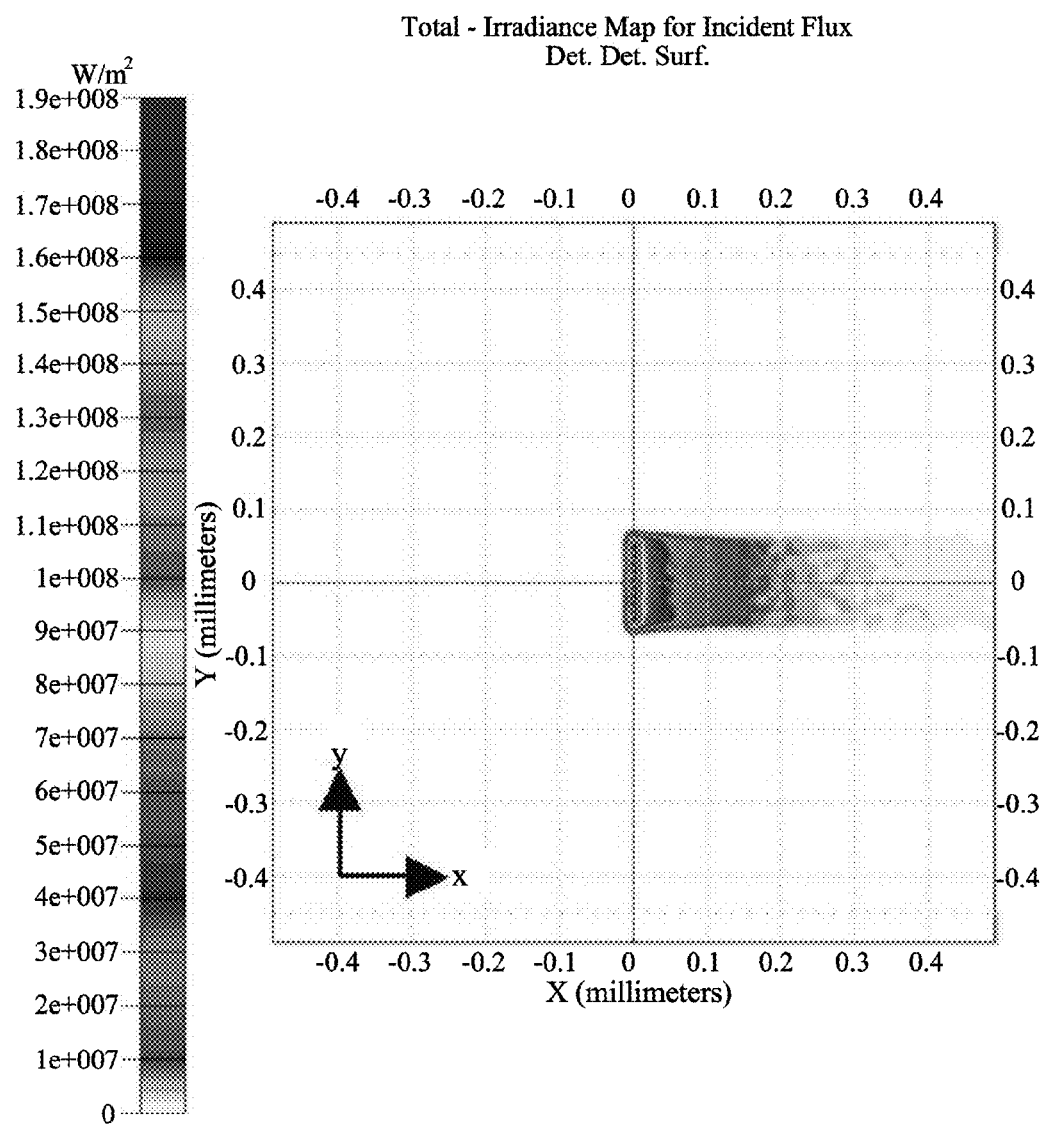

FIGS. 3A and 3B show simulated diffraction intensity distributions on the sensor at a focal plane (Gauss image plane). FIG. 3A corresponds to the simulation for m=−3, in which the predetermined gap is 0 (G=0 mm) and there is no divergence in the sagittal plane (δ/2=0°) for the incident beam. The color in the figure denotes the intensity of the light hitting the corresponding location on the sensor area. It shows a well-focused spot on the sensor area, even though the waveguide is present.

However, once the incident beam has a divergence in the sagittal plane SP, the image on the sensor is no longer a spot, as shown in FIG. 3B. The parameter setting is the same as that of FIG. 3A, except for the sagittal divergent half angle δ/2=12°. The image becomes divergent but stays within a finite y (sagittal) range defined in FIG. 1, due to the restriction imposed by the waveguide. However, there is severe and asymmetrical distortion along the x direction, which is also the wavelength dispersion direction. This comatic dispersion along the x direction (defined in FIG. 1) on the sensor is not a typical Gaussian-shaped dispersion observed by a normal spectrometer for a single wavelength input, where the beam propagates in free space and is not confined within the slab wave-guiding device of this invention. In the simulated result, a sub-signal at the proximal wavelength beside the main wavelength is detected as a side tail (referred to as the side-tail effect). We can now attribute it to the distortion caused by the slab wave-guiding device. This comatic distortion degrades the spectral resolution of the SWMG spectral measurement system.

In order to solve this problem of degradation in spectral measurement introduced by the slab wave-guiding device, a systematic approach is figured out to restore the comatic distortion of the spectrum to a normal Gaussian-shaped spectrum (of a single wavelength input). In this approach, two parameters are adjusted. The parameters include (a) the predetermined gap G, and (b) the pixel height h (the vertical size of the pixel defined in FIG. 2C) of the linear image sensor unit used to acquire the spectrum. Thus, in the simulation procedure, different gaps are simulated to determine the predetermined gap with the image sensor unit being set at the focal plane. Also, the height h of a pixel of photo sensor 44 of the image sensor unit 40 is determined by the simulation procedure, in which different heights of the pixel of photo sensor are simulated with the image sensor unit 40 being set at the focal plane so as to determine the height of the pixel of photo sensor 44 of the image sensor unit 40.

Figure 4A:
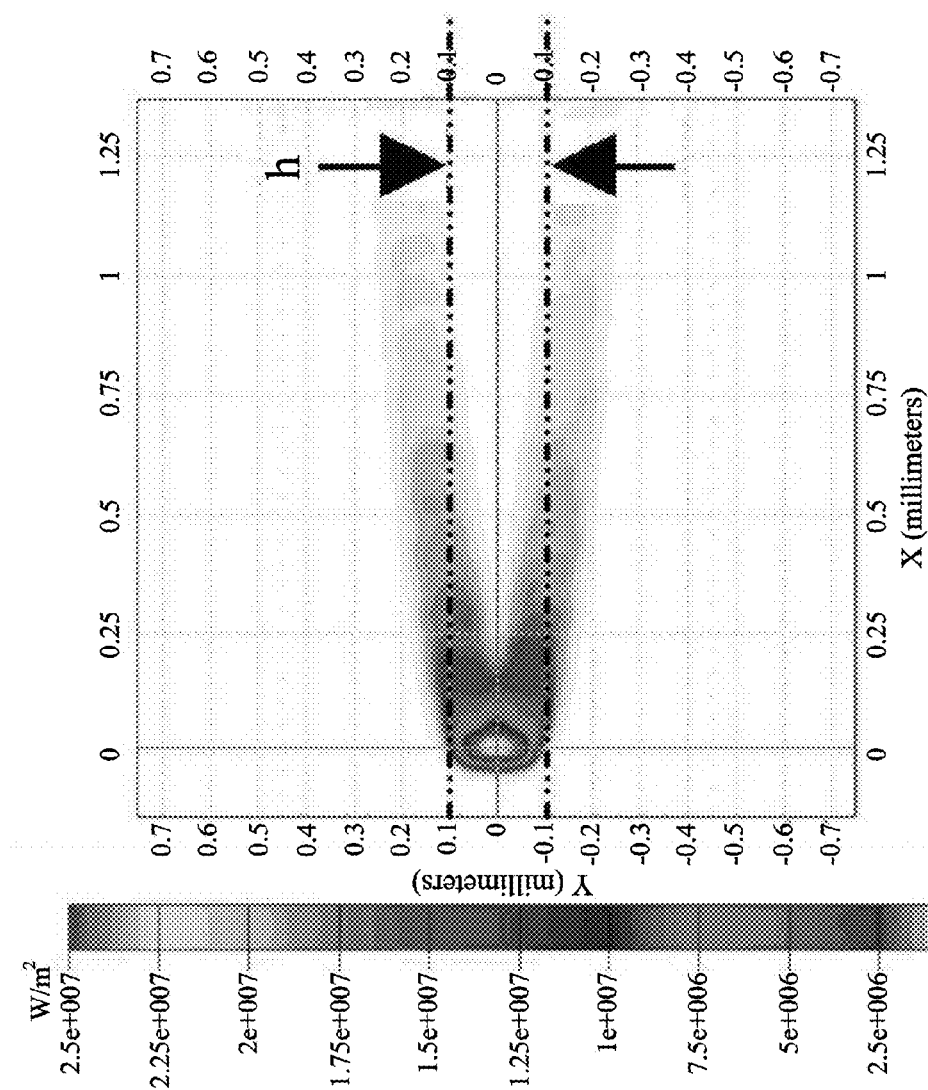
FIGS. 4A to 4C show simulated diffraction intensity distributions on the sensor at the focal plane.
Figure 4B:
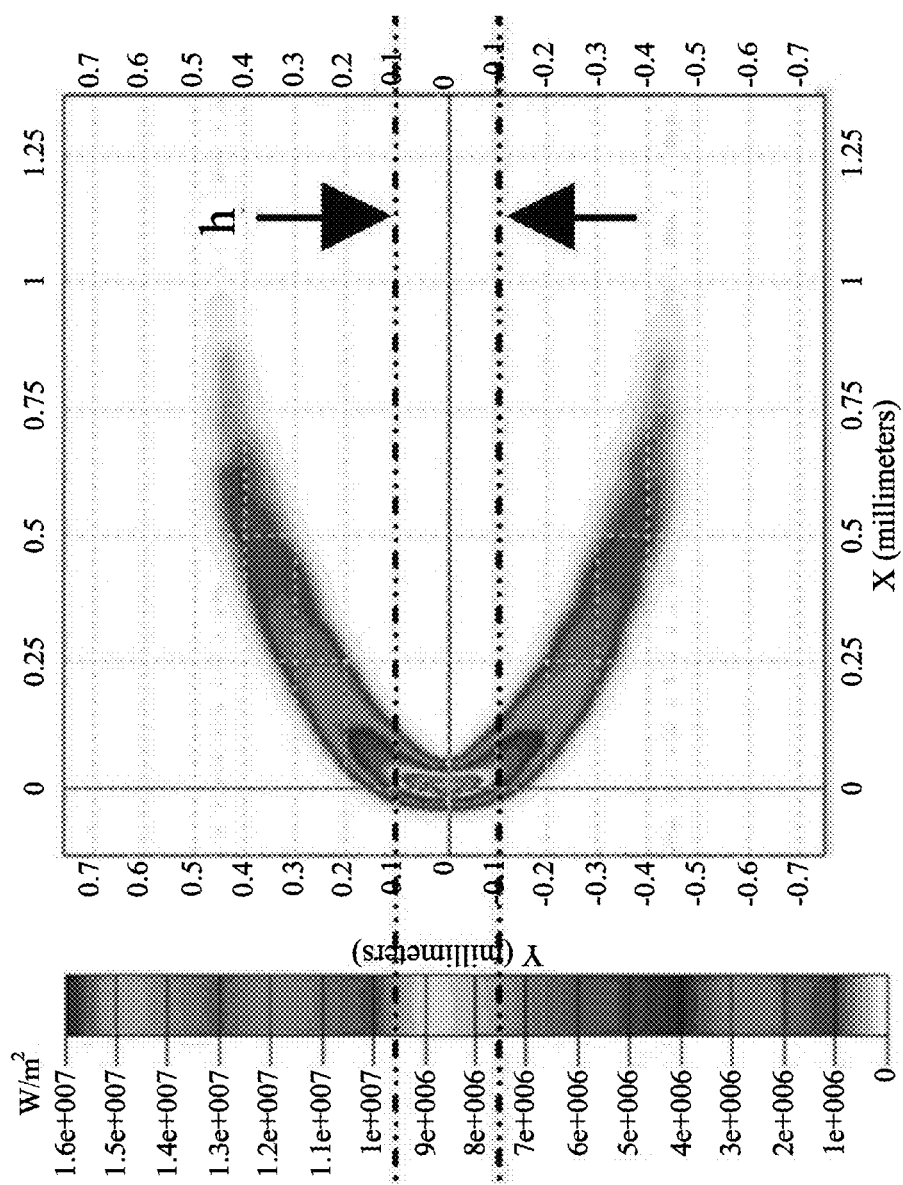
Figure 4C:
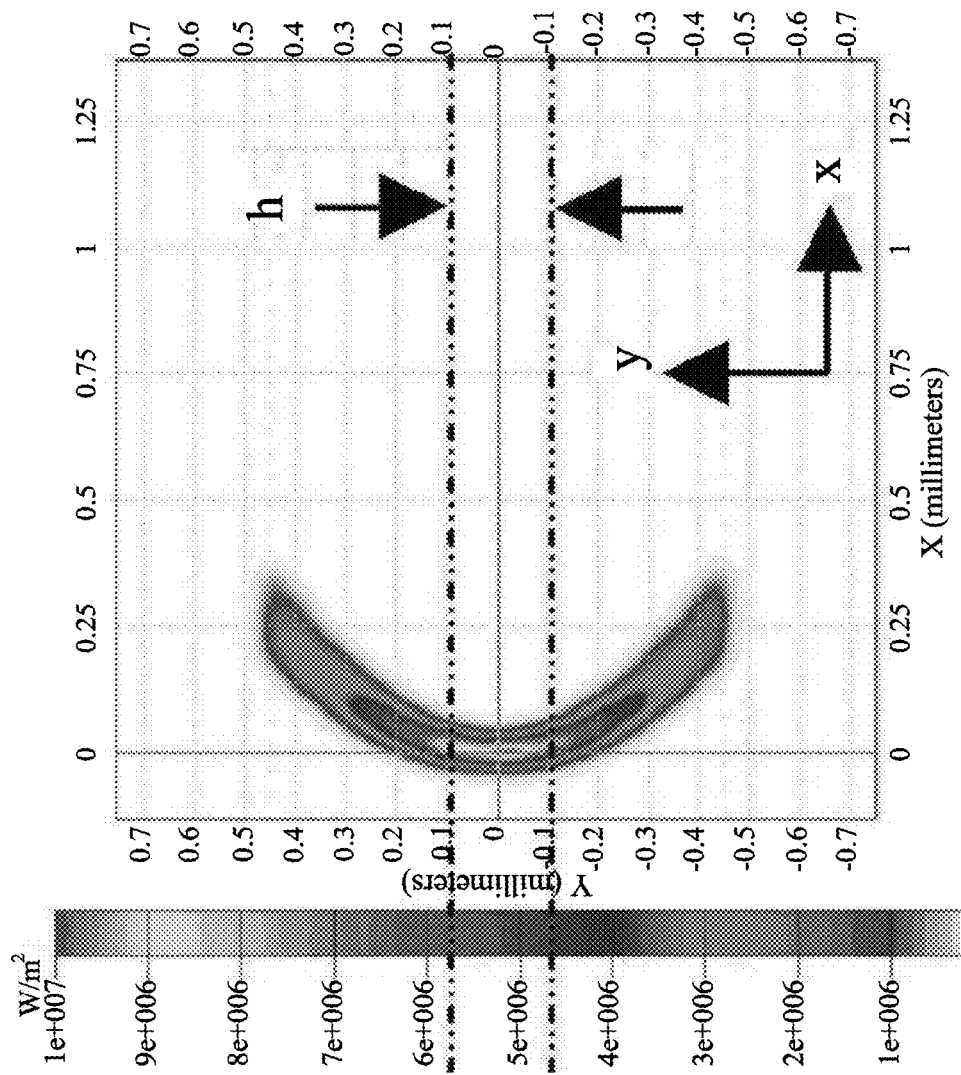

According to the simulated result, it is obtained that the distortion becomes quite different by adjusting the predetermined gap G. The existence of this gap G allows the beam to exit the waveguide with a divergence in the sagittal direction onto the sensor plane. Consequently, the wider gap yields an image that is more divergent in the y direction, as shown in FIGS. 4A to 4C. FIGS. 4A to 4C show simulated diffraction intensity distributions on the sensor at the focal plane for G=1, 3 and 5 mm. The simulation shows that the strongest intensity remains at the desired x location and at the center of y range/axis. However, the diffracted light image distortion is split into two tails, forming a crescent-shaped distribution. For the widest gap (G=5 mm) in the simulation, the intensity distribution in the y direction is actually greater than the simulated sensor area (1.50 mm in horizontal by 0.90 mm in vertical). As a result, the distribution shown in FIG. 4C is truncated in the y direction and not captured completely as shown in FIGS. 4A and 4B.

Figure 5:
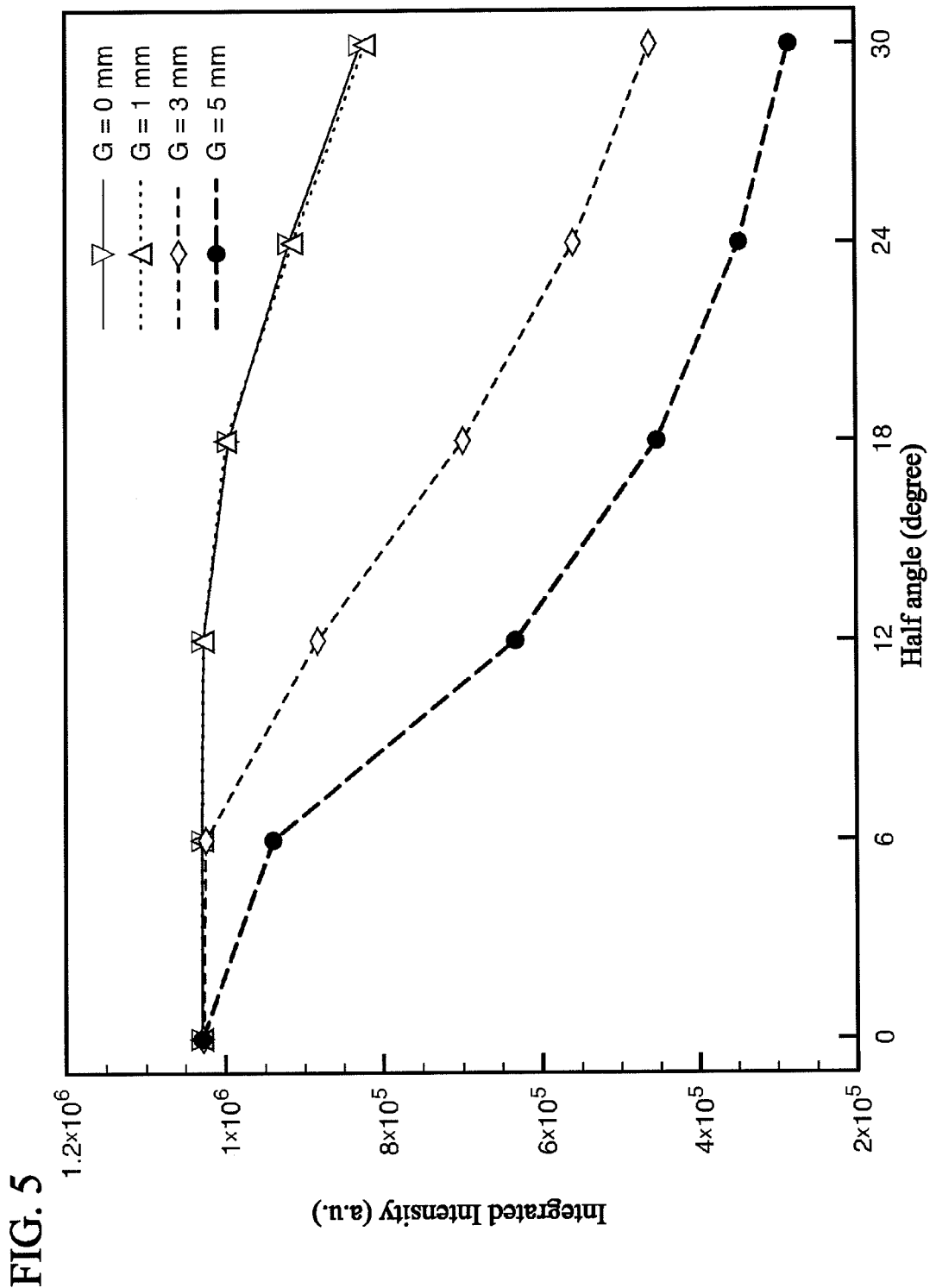
FIG. 5 is a graph showing peak intensities versus vertical divergent half-angles for various gaps.

FIG. 5 is a graph showing peak intensities versus vertical divergent half-angles for various gaps. In FIG. 5, the horizontal axis represents the half-angle (in degrees) and the vertical axis represents the peak intensity (absorbance unit, hereinafter referred to as a.u.). The peak intensity on the sensor (for example, at the cross-hair mark in FIGS. 3A to 4C) is plotted as a function of the sagittal divergent half-angles δ/2 (in degrees) for various predetermined gaps G (in mm). The simulation shows that the peak intensity degrades relatively little for gapless and small gap (G=1 mm) configurations, as the sagittal divergent angle of the incident light becomes greater. This indicates that the photon energy distribution remains nearly constant at the spot on the sensor for G=0 and 1 mm, no matter how divergent the incident light is. On the other hand, the peak intensity of G=5 mm drops significantly as the incident light's sagittal divergent angle increases. It happens because the photon energy distribution is wide over the sensor area and varies significantly as the incident light becomes more divergent.

Figure 6:
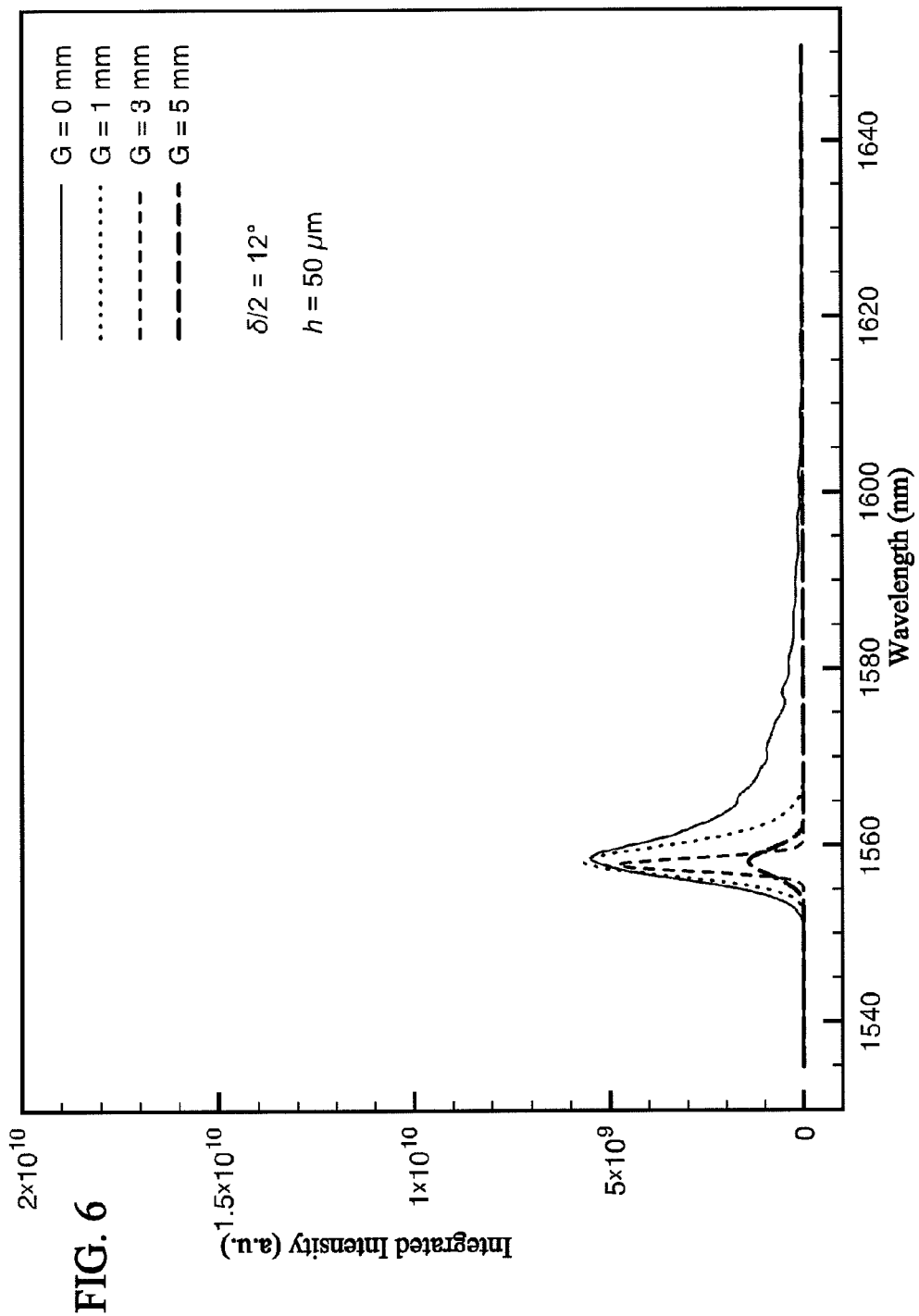
FIGS. 6 to 8 show the relationships between wavelengths and integrated light intensities of the linear image sensor area for various gaps.
Figure 7:
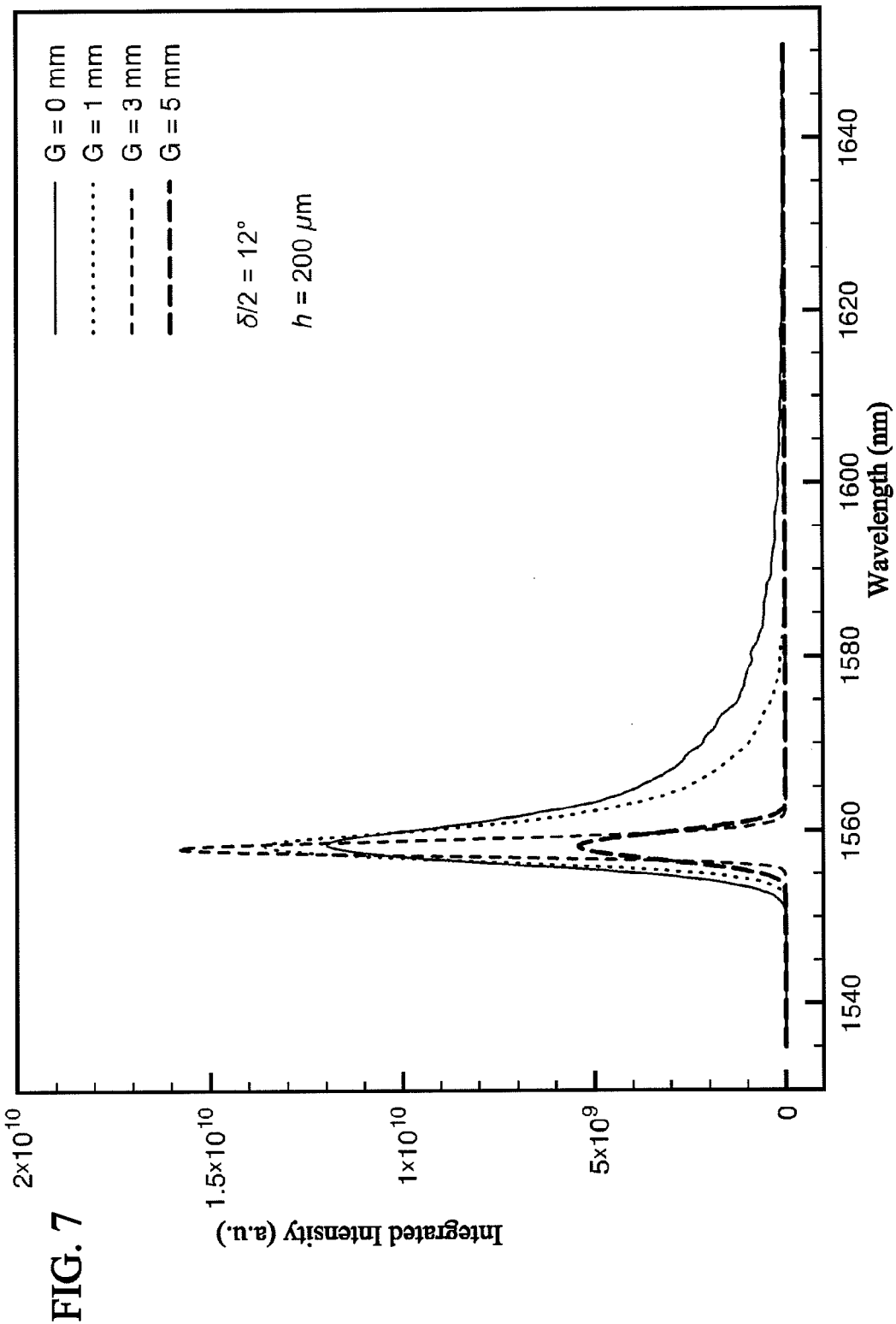
Figure 8:
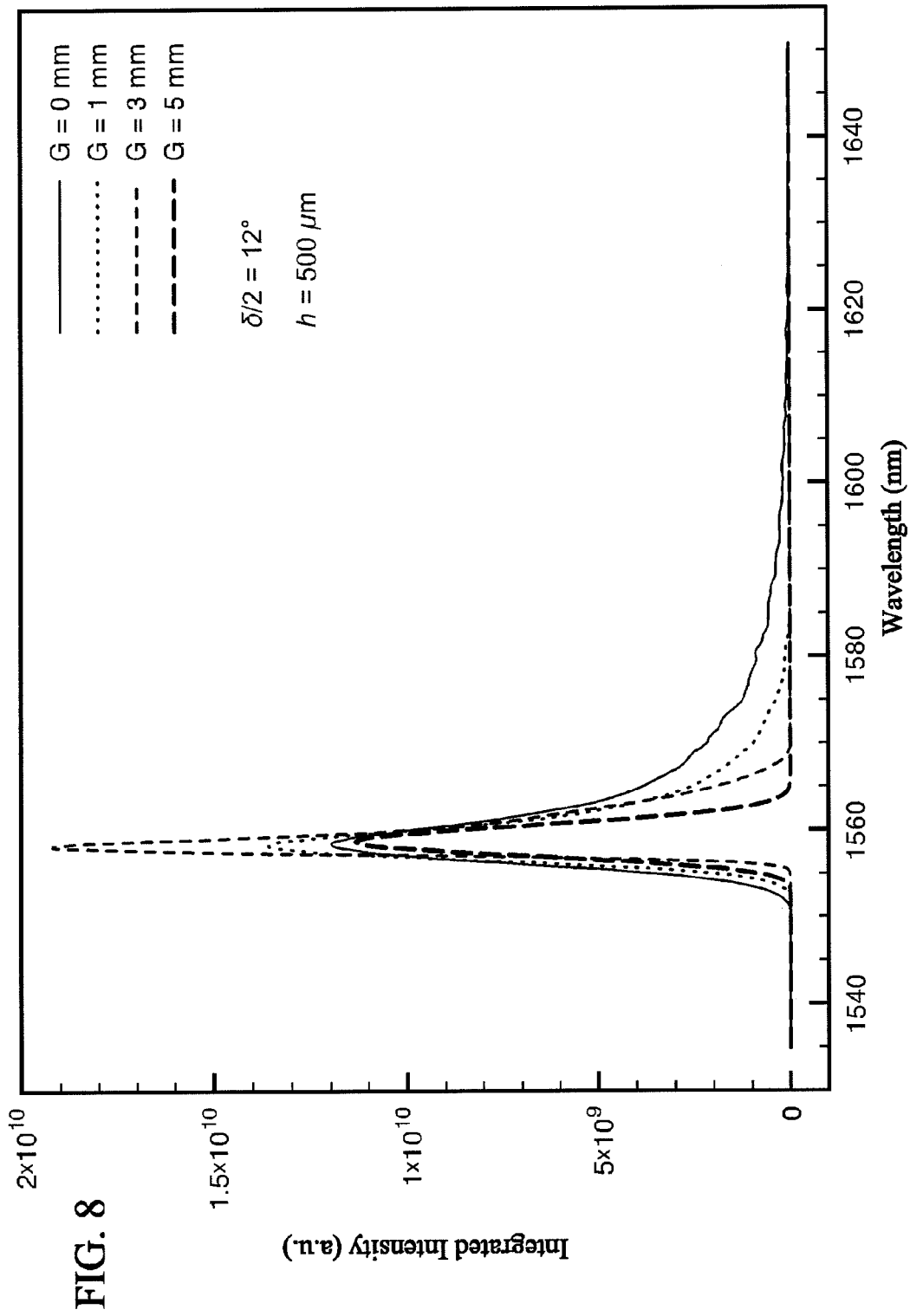

The vertical pixel size, which is denoted as h in FIGS. 4A to 4C, has three values of 50, 200 and 500 μM chosen for three commercially available linear image sensors to demonstrate the process of spectral resolution recovery. To collect more light signals on the linear image sensor, the larger vertical pixel size is used. However, the larger vertical pixel size includes more portions of the crescent-shaped distortion image (see FIGS. 4A to 4C) and results in an incorrect wavelength reading, as illustrated in FIGS. 6, 7 and 8. Here the integrated intensity within the vertical pixel size range (i.e., within the range of the two dashed lines in FIGS. 4A to 4C) on the linear image sensor is plotted as a function of the wavelength readout for various gap widths of G and vertical pixel sizes of h, with the sagittal incident divergent half-angle at δ/2=12°, which is the typical divergent angle of the beam exiting from an optical fiber.

The gapless configuration always gains the highest shoulder (side-tail) on the long wavelength side of the peak for all three integration ranges of h because the comatic spread observed in FIG. 3B is always within the integration range. On the other hand, the existence of the gap reduces the side-tail spread because the vertical integration range (h) only captures the central portions (in the vertical direction) of the crescent-shaped image (see the region within the two dashed lines in FIGS. 4A to 4C). The peak intensities and the full-width-at-half-maximum (FWHM) spectral widths (i.e., the spectral resolution Δλ) of the spectral curves are listed in Tables 1 and 2.

TABLE 1

| Integration range, h | Gap Width, G | | | |
| --- | --- | --- | --- | --- |
| | G = 0 mm | G = 1 mm | G = 3 mm | G = 5 mm |
| h = 50 μm | 1558.582 | 1558.242 | 1557.789 | 1558.129 |
| h = 200 μm | 1558.468 | 1558.242 | 1558.015 | 1558.242 |
| h = 500 μm | 1558.468 | 1558.242 | 1558.242 | 1558.808 |

TABLE 2

| Integration range, h | Gap Width, G | | | |
| --- | --- | --- | --- | --- |
| | G = 0 mm | G = 1 mm | G = 3 mm | G = 5 mm |
| h = 50 μm | 1.875 | 1.781 | 1.031 | 0.938 |
| h = 200 μm | 1.875 | 1.875 | 1.219 | 1.125 |
| h = 500 μm | 1.875 | 1.875 | 1.875 | 1.594 |

In order to improve the spectral resolution Δλ (i.e., to reduce the FWHM spectral width), a wider gap G should be chosen. On the other hand, a wider gap will lose much of the photon energy outside the linear image sensor area in the vertical direction (y direction) due to a taller crescent-shaped spread. This results in a weaker signal (see FIG. 5). Also, a greater vertical integration range (greater h value) yields higher peaks (see FIGS. 6, 7 and 8), among the integration ranges (vertical pixel sizes h in FIGS. 4A to 4C) of 50, 200 and 500 μm. However, the configuration of 500 μm integration range (h=500 μm) results in no significant reduction in the peak's width as the gap G becomes wider (see FIG. 8).

Among the various gap widths of G and the vertical integration ranges of h, the configuration of G=3 mm has the optimal performance in the signal strength and the FWHM spectral width, i.e., the spectral resolution Δλ. It is obvious from the curves of G=3 mm in FIGS. 6, 7 and 8 and the values in Table 2. If the spectral resolution Δλ is the major concern, then the vertical integration range h of 50 μm and the gap width G of 5 mm should be chosen (see FIG. 6 and Table 2). On the other hand, if the peak photon intensity on the linear image sensor is a major concern, then the vertical integration range h of 500 μm and the gap width G of 3 mm should be selected (see the curve of G=3 mm in FIG. 8) with the price of degradation in the spectral resolution Δλ. In such case, the spectral resolution Δλ is 1.875 nm with the values (G, h)=(3 mm, 500 μm) compared to that of 0.938 nm for (G, h)=(5 mm, 50 μm) (see Table 2). The optimal trade-off values are G=3 mm and h=200 μm, where the spectral resolution Δλ is 1.219 nm (see Table 2) and the peak intensity is still maintained at a relatively higher value (see G=3 mm curve in FIG. 7).

The spectrometer using the slab waveguide has the advantage of small size and can be further developed to become a chip-based spectrometer. In the case of G=0 mm (gapless situation), the comatic spread of the diffracted pattern (see FIG. 3B) is caused by the slab waveguide. This results in a side-tail in the spectrum (see the curves of G=0 mm in FIGS. 6, 7 and 8). This side-tail effect causes inaccurate spectral reading in the spectral peak positions (see Table 1) and the spectral resolution.

In this invention, a procedure has been proposed to remove the side-tail effect from the spectral reading by: (a) allowing the gap width G to be adjustable; and (b) choosing an appropriate vertical pixel size h of the linear image sensor. By allowing certain gap between the sensor plane and the waveguide edge, the resultant focal pattern spreads in the crescent-shaped distribution (see FIGS. 4A to 4C) on the sensor plane. With a vertical pixel height h (see FIG. 4) positioned at y=0, the linear image sensor only captures the central portion of the crescent-shaped distribution. As a result, the side-tail spectrum of the gapless configuration (see spectral curves of G=0 mm in FIGS. 6, 7 and 8) is fully restored to a normal Gaussian-shaped spectral curve (see the curves of G=3 and 5 mm in FIGS. 6, 7 and 8). Using this G-h adjustment mechanism, the problem of the side-tail effect has been fully resolved. Thus, it is concluded that the predetermined gap G affects the crescent-shaped distribution of the spectrum components, that the height of the pixel of photo sensor 44 of the image sensor unit 40 affects the integration range h, that the vertical divergent half-angle of the second optical signal S2 affects the crescent-shaped spread, that the divergent half-angle matches with the height h of the pixel of photo sensor 44 through the predetermined gap G, and that the predetermined gap G allows the spectrum components to diverge in a direction of the height h of the pixel of photo sensor 44, so that two tail portions of the crescent-shaped distribution induced b the divergent half-angle substantially fall outside the integration range h of the image sensor unit 40.

With this invention, the designer can easily obtain or choose the predetermined gap according to the parameter of the image sensor unit to effectively eliminate the poor effect caused by the side-tail effect. The specification for designing the conventional spectrometer always has to place the slab waveguide in close contact with the image sensor unit in order to reduce the light loss. However, the invention completely gets rid of the conventional specification of designing the conventional spectrometer, so that the image sensor unit can obtain the better spectral reading. Although the invention is described based on the Rowland circle and the diffraction grating with the constant pitch, the invention is also adapted to the non-Rowland circle arrangement and the diffraction grating with the non-constant pitch because the Rowland circle and the diffraction grating with the constant pitch are the theoretical basis for the diffraction. In addition, the profile of the diffraction grating may include a straight line, an arc or any other curved surface. So, the input section 20 and the image sensor unit 40 need not to be located on the Rowland circle RC.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. A spectrometer capable of eliminating side-tail effects, the spectrometer comprising:
   a body;
   an input section, mounted in the body, for receiving a first optical signal and outputting a second optical signal travelling along a first light path;
   a diffraction grating, mounted in the body, for receiving the second optical signal and separating the second optical signal into a plurality of spectrum components, comprising a specific spectrum component travelling along a second light path;
   an image sensor unit, mounted in the body, for receiving the specific spectrum component;
   a wave-guiding device, which is mounted in the body and comprises a first reflective surface and a second reflective surface opposite to each other, wherein the wave-guiding device is for limiting the first light path and the second light path between the first reflective surface and the second reflective surface to guide the second optical signal and the specific spectrum component, wherein the first and second reflective surfaces are separated from a light receiving surface of the image sensor unit by a predetermined gap; and
   an adjusting mechanism, connected to the image sensor unit and the wave-guiding device, for adjusting a width of the predetermined gap.

2. The spectrometer according to claim 1, wherein the image sensor unit comprises;
   a substrate;
   at least one pixel of photo sensor, which has the light receiving surface and is disposed on the substrate; and
   a protection cover, which is disposed above the substrate and covers the at least one pixel of photo sensor.

3. The spectrometer according to claim 2, wherein a thickness of the protection cover is substantially equal to the width of the predetermined gap.

4. The spectrometer according to claim 2, wherein a thickness of the protection cover is smaller than the width of the predetermined gap.

5. The spectrometer according to claim 2, wherein the predetermined gap relates to a height of the at least one pixel of photo sensor in a direction perpendicular to the first and second reflective surfaces.

6. The spectrometer according to claim 2, further comprising a filter disposed on an external surface of the protection cover and between the protection cover and the wave-guiding device.

7. The spectrometer according to claim 6, wherein the filter has a coated section for filtering out a portion of the spectrum components having a predetermined range of wavelength.

8. The spectrometer according to claim 2, wherein the protection cover has a coated section for filtering out a portion of the spectrum components having a predetermined range of wavelength.

9. The spectrometer according to claim 1, wherein the wave-guiding device comprises:
   a first reflecting mirror having the first reflective surface; and
   a second reflecting mirror having the second reflective surface.

10. The spectrometer according to claim 1, wherein the image sensor unit comprises:
    a substrate; and
    at least one pixel of photo sensor, which has the light receiving surface and is disposed on the substrate.

11. The spectrometer according to claim 1, wherein a height of a pixel of photo sensor of the image sensor unit is determined by a simulation procedure, in which different heights of the pixel of photo sensor are simulated with the image sensor unit being set at a focal plane so as to determine the height of the pixel of photo sensor of the image sensor unit.

12. The spectrometer according to claim 1, wherein the wave-guiding device comprises:
    a first reflecting mirror having the first reflective surface; and
    a second reflecting mirror having the second reflective surface, wherein the spectrum components leave the wave-guiding device through an opening between the first reflecting mirror and the second reflecting mirror and enter the image sensor unit, and the opening is separated from the light receiving surface by the predetermined gap.

13. The spectrometer according to claim 1, wherein the predetermined gap affects a crescent-shaped distribution of the spectrum components, a height of a pixel of photo sensor of the image sensor unit affects an integration range, a vertical divergent half-angle of the second optical signal affects a crescent-shaped spread, the divergent half-angle matches with the height of the pixel of photo sensor through the predetermined gap, and the predetermined gap allows the spectrum components to diverge in a direction of the height of the pixel of photo sensor, so that two tail portions of the crescent-shaped distribution induced by the divergent half-angle substantially fall outside the integration range of the image sensor unit.

14. A spectrometer capable of eliminating side-tail effects, the spectrometer comprising:

a body;

an input section, mounted in the body, for receiving a first optical signal and outputting a second optical signal travelling along a first light path;

a diffraction grating, mounted in the body, for receiving the second optical signal and separating the second optical signal into a plurality of spectrum components travelling along a second light path;

an image sensor unit, mounted in the body;

a wave-guiding device, which is mounted in the body and comprises a first reflective surface and a second reflective surface opposite to each other, wherein the wave-guiding device is for limiting the first light path and the second light path between the first reflective surface and the second reflective surface to guide the second optical signal and the spectrum components, wherein an opening of the wave-guiding device is separated from a light receiving surface of the image sensor unit by a predetermined gap, the spectrum components leave the opening of the wave-guiding device and enter the image sensor unit; and an adjusting mechanism, connected to the image sensor unit and the wave-guiding device, for adjusting a width of the predetermined gap.

15. The spectrometer according to claim 14, wherein the predetermined gap ranges from 1 mm to 5 mm.

16. The spectrometer according to claim 14, wherein the predetermined gap is greater than 1 mm.

17. The spectrometer according to claim 14, wherein a height of a pixel of photo sensor of the image sensor unit is determined by a simulation procedure, in which different heights of the pixel of photo sensor are simulated with the image sensor unit being set at a focal plane so as to determine the height of the pixel of photo sensor of the image sensor unit.

18. The spectrometer according to claim 14, wherein the opening is substantially perpendicular to the first reflective surface or the second reflective surface.

19. The spectrometer according to claim 14, wherein the wave-guiding device comprises:

a first reflecting mirror having the first reflective surface; and a second reflecting mirror having the second reflective surface, wherein the opening is located between the first reflecting mirror and the second reflecting mirror.

20. The spectrometer according to claim 14, wherein the predetermined gap affects a crescent-shaped distribution of the spectrum components, a height of a pixel of photo sensor of the image sensor unit affects an integration range, a vertical divergent half-angle of the second optical signal affects a crescent-shaped spread, the divergent half-angle matches with the height of the pixel of photo sensor through the predetermined gap, and the predetermined gap allows the spectrum components to diverge in a direction of the height of the pixel of photo sensor, so that two tail portions of the crescent-shaped distribution induced by the divergent half-angle substantially fall outside the integration range of the image sensor unit.

\* \* \* \* \*